US012573281B2

(12) United States Patent
Pooja

(10) Patent No.: US 12,573,281 B2
(45) Date of Patent: Mar. 10, 2026

(54) CONTROLLER TO DETECT NON-SWIM ACTIVITY OF A SWIMMER AND METHOD THEREOF

(71) Applicants: Robert Bosch GmbH, Stuttgart (DE); Robert Bosch Engineering and Business Solutions Private Limited, Bangalore (IN)

(72) Inventor: Mohan Pooja, Trivandrum (IN)

(73) Assignees: Robert Bosch GmbH, Stuttgart (DE); Robert Bosch Engineering and Business Solutions, Karnataka (IN)

( * ) Notice: Subject to any disclaimer, the term of this patent is extended or adjusted under 35 U.S.C. 154(b) by 396 days.

(21) Appl. No.: 18/305,353

(22) Filed: Apr. 23, 2023

(65) Prior Publication Data

US 2023/0351876 A1 Nov. 2, 2023

(30) Foreign Application Priority Data

Apr. 29, 2022 (IN) ............................ 202241025119

(51) Int. Cl.
*G08B 21/04* (2006.01)

(52) U.S. Cl.
CPC ................................ *G08B 21/0446* (2013.01)

(58) Field of Classification Search
CPC .. G06F 18/24; G06F 2218/12; G08B 21/0446
USPC .......................................................... 702/141
See application file for complete search history.

(56) References Cited

U.S. PATENT DOCUMENTS

2010/0204952 A1* 8/2010 Irlam .................... G04G 21/02
702/141
2010/0210975 A1* 8/2010 Anthony, III ........ A61B 5/1123
600/595
2021/0068713 A1 3/2021 Dervisoglu et al.

* cited by examiner

*Primary Examiner* — John H Le
(74) *Attorney, Agent, or Firm* — Maginot, Moore & Beck LLP

(57) ABSTRACT

A controller is configured to receive raw signals from at least one gyroscope for at least two axes. The controller processes the raw signals through a BPF and output a filtered signal. The controller processes the filtered signal through an energy envelope estimator and determines an energy envelope signal for at least one axis. The controller then determines a nonswim activity in a segment based on the energy envelope signal through a detector. The energy envelope estimator is configured to generate the energy envelope signal using sliding window average of a preset window size over the filtered signal. The detector is configured to compare values of the energy envelope signal for at least one axis against respective threshold value, and classify the segment of the raw signals as non-swim activity upon satisfactory comparison.

10 Claims, 4 Drawing Sheets

CONTROLLER TO DETECT NON-SWIM ACTIVITY OF A SWIMMER AND METHOD THEREOF

This application claims priority under 35 U.S.C. § 119 to application no. IN 202241025119, filed on Apr. 29, 2022 in India, the disclosure of which is incorporated herein by reference in its entirety.

The present disclosure relates to a controller to detect non-swim activity of a swimmer and method thereof.

BACKGROUND

Current wearable market is totally driven by new smart features like swim analytics, activity detections etc. It is always helpful to measure swimming progress via times during workouts. Gauging times in the pool is an accurate way to determine swimmer's level and how much he/she has progressed. In techniques like short rest interval swimming, swimmer takes short rests after completing certain number of lengths and resumes swimming after the rest interval. Also, swimming is inevitably affected by large number of people present in case of public pools, making swimmers to temporarily rest in the pool. Thus, it is desirable to break a pool swim session into swim intervals and non-swim (start/stop/rest) intervals to know the accurate time utilized in both the cases. Another point of consideration is the swimmer efficiency or performance analysis—swim metrics like swimming time, resting time, length time, inter-length rest time, distance, average pace, etc., must not get computed during non-swim intervals as this could lead to poor accuracy of swim tracking device. There are two ways to do non-swim detection—pressing a button manually by the swimmer to indicate that rest/pause has started or by automatically detecting the non-swim period.

In most of the existing solutions, swimmer must manually press a button in his/her swim tracking device when he/she wishes to pause in between. When the swimmer is ready to resume swimming, he/she must press the button again to end the pause and start a new swim interval. This action is tedious (not user-friendly) and if swimmer forgets to do this, his performance metrics gets affected. In 'Auto rest' feature present in some devices, it detects rest of minimum 20 secs of duration. Therefore, short rest/pause (less than ~20 secs) are not get captured.

Also, current solutions use accelerometer for non-swim detection which could provide false positives as accelerometer might detect normal hand movements made during rest time as swim strokes and thus falsely increment swim time, strokes, and lengths during this time. Therefore, swimmer must stand very idle during rest time (shouldn't move his arms around very much) for it to be detected accurately using accelerometer-based solutions. There is need for innovation to make the swim analytics feature more innovative and intuitive by automatically detecting the rest time during swimming without expecting the swimmer to provide the details.

According to a prior art US2021068713 detecting swimming activities on a wearable device is disclosed. Disclosed embodiments include wearable devices and techniques for detecting swimming activities. classifying user motion, detecting water submersion, and monitoring performance during swimming activities. By accurately and promptly detecting swimming activities and automatically distinguishing between different swimming stroke type performed during a swimming activity, the disclosure enables wearable devices to accurately calculate user performance information when user: forget to start and/or stop recording swimming activities. In various embodiments, swimming activity detection techniques may improve the selectivity of motion based methods of identifying swimming activities identification by confirming motion analysis with water immersion and pressure data analysis that detects when the wearable device is submerged in water.

BRIEF DESCRIPTION OF THE DRAWINGS

An embodiment of the disclosure is described with reference to the following accompanying drawings.

DETAILED DESCRIPTION

Figure 1:
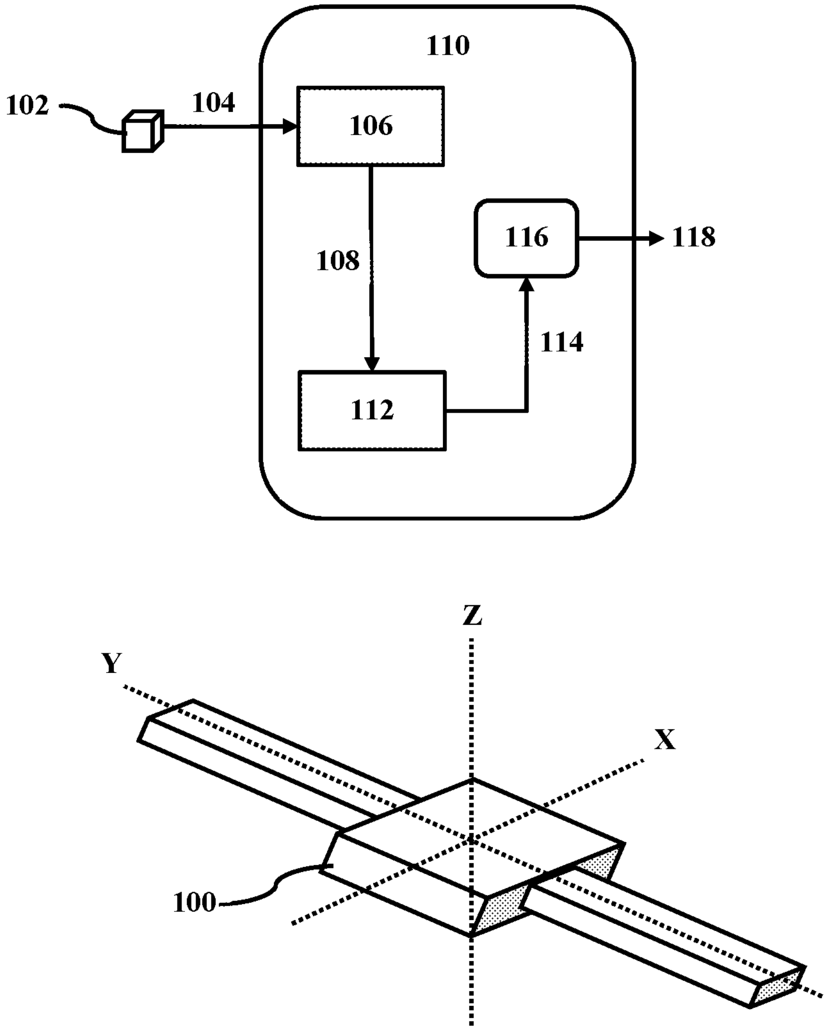
FIG. 1 illustrates a block diagram of a controller to determine non-swim activity of a swimmer, according to an embodiment of the present disclosure.

FIG. 1 illustrates a block diagram of a controller to determine non-swim activity of a swimmer, according to an embodiment of the present disclosure. The controller 110 receives signals from at least one gyroscope 102. The gyroscope 102 is part of the wearable device 100. The controller 110 configured to receive raw signals 104 from the gyroscope 102 for at least two axes, characterized in that, process the raw signals 104 through a Band Pass Filter (BPF) 106 and output a filtered signal 108 for at least one of the raw signals 104. The controller 110 processes the filtered signal 108 through an energy envelope estimator 112 and determines an energy envelope signal 114 for at least one axis of the at least two axes. The controller 110 then determines a non-swim activity in a segment of the raw signals 104 based on the energy envelope signal 114 through a detector 116. The energy envelope estimator 112 configured to generate the energy envelope signal 114 using sliding window average of a preset window size over the filtered signal 108. The detector 116 configured to compare values of the energy envelope signal 114 for at least one axis against respective threshold value, and classify the segment of the raw signals 104 as non-swim activity upon satisfactory comparison.

The gyroscope 102 based automatic non-swim (start/stop/rest) detection system is used to help differentiate the time when swimmer is actually performing swimming from the total time, he/she has spent in the pool. The non-swim activity/time includes all the actions performed by swimmer in pool other than swimming i.e. actions performed by swimmer before start of swimming (adjusting his goggles/cap, standing at pool edge to warm up, etc.), taking pause in between lengths, resting at edge of pool after finishing swimming, etc. The controller 110 provides information indicative of how much the swimmer has swum and how much rest/pause/non-swim activity has been taken in the pool. Thus, the controller 110 enables calculation of total swim time vs total non-swim time in the pool.

Also, during rest interval, swimmer might perform some hand movements which might get detected as swim strokes and thus produce incorrect swim metrics. This will affect overall accuracy of the swim tracking device. By automatically detecting rest time, any stroke count increment, length count increment, etc. reported during this time is negated by the controller 110.

According to the present disclosure, the controller 110 is equipped with necessary signal detection, acquisition, and processing circuits along with connection to other sensors (if required). The controller 110 is a control unit (computing device) which comprises memory element such as Random Access Memory (RAM) and/or Read Only Memory (ROM), Analog-to-Digital Converter (ADC) and a Digital-to-Analog Convertor (DAC), clocks, timers, counters and at least one micro-processor/micro-controller (capable of implementing machine learning) connected with each other and to other components through communication bus channels. The memory element is pre-stored with logics or instructions or programs or applications or modules/models and/or threshold values, which is/are accessed by the at least one processor as per the defined routines. The internal components of the controller 110 are not explained for being state of the art, and the same must not be understood in a limiting manner. The controller 110 may also comprise communication units to communicate with an external computing device such as the cloud, a remote server, etc., through wireless or wired means such as Global System for Mobile Communications (GSM), 3G, 4G, 5G, Wi-Fi, Bluetooth, Ethernet, serial networks, and the like. The controller 110 is implementable in the form of System-in-Package (SiP) or System-on-Chip (SOC) or any other known types.

According to an embodiment of the present disclosure, the controller 110 comprises the Band Pass Filter (BPF) 106, the Energy Envelope Estimator 112 and the Detector 116 as three modules stored in the memory element. The raw signals 104 from the gyroscope 102 is passed through the BPF 106 designed with a particular passband frequency range to pass only the frequencies corresponding to swimming stroke patterns and to remove any frequencies that correspond to hand movements or other motions that the swimmer might perform during rest time. For example, passband frequency range is set as [0.2-0.833] Hz.

Now with respect to the energy envelope estimator 112, when the swimmer is performing stroke movements while swimming, periodic patterns are observed in the signal waveform corresponding to strokes. When swimmer is resting, signals are irregular and non-periodic in nature. Thus, in the energy envelope of filtered signal 108, the energy is high during swim time and low during the rest time. For determining the energy, the energy envelope estimator 112 computes the moving variance of the filtered signal 108 along each channel/axis independently over time.

The energy envelope estimator 112 uses sliding window method to compute the energy. In the sliding window method, a window of specified length moves over the data sample-by-sample, and the energy over the data in the window is computed. For example, the window length is set as 3 seconds, and if sampling frequency of raw signal 104 is 100 Hz, the energy is computed over 300 samples of data at a time. The energy estimator 112 is explained using FIG. 2 and FIG. 3.

According to an embodiment of the present disclosure, the controller 110 uses data from at least one axis from a group comprising Y-axis and combination of X-axis and Y-axis. The axis orientation of the gyroscope 102 with respect to wrist wearable device 100 is same as smartphone orientation. The X axis is tangential to the ground and points east, the Y axis is tangential to the ground and points towards magnetic north, and, and the Z axis points towards the sky and is perpendicular to the plane made up of X and Y axes. The at least one gyroscope 102 is either standalone or part of the Inertial Measurement Unit (IMU) sensor.

Figure 2:
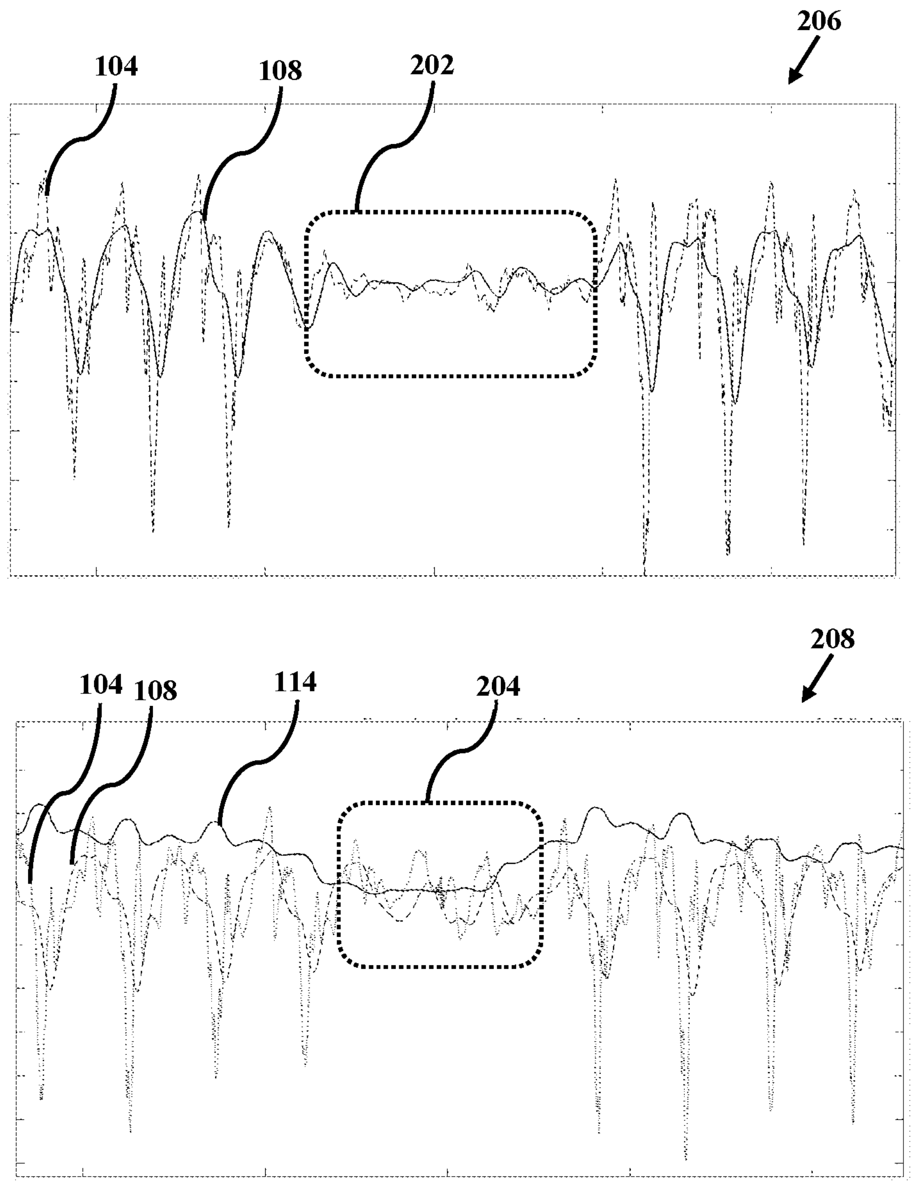
FIG. 2 is a plot of signals over Y axis of gyroscope, according to an embodiment of the present disclosure.

FIG. 2 is a plot of signals over Y axis of gyroscope, according to an embodiment of the present disclosure. In the embodiment, the controller 110 uses one axis, specifically Y axis. A first plot 206 illustrates raw signals 104 of the gyroscope 102 along Y axis, and filtered signal 108 along Y axis. Similarly, a second plot 208 illustrates raw signals 104 of the gyroscope 102 along Y axis, and filtered signal 108 along Y axis and the energy envelope signal 114 computed along of Y axis. A first window 202 depicts rest time whereas the other sections are the swim time. A second window 204 represents the non-swim time as the energy envelope signal 114 which is calculated by moving average method where a window of specified length moves over the data sample-by-sample, and the energy over the data in the window is computed. During non-swim time, the energy on filtered signal 108 of Y axis is considerably low whereas during swim time, the energy of filtered signal 108 of Y axis is high. Thus, the energy envelope signal 114 of Y axis is a good feature to distinguish non-swim time from swim time, and is used by the controller 110.

Figure 3:
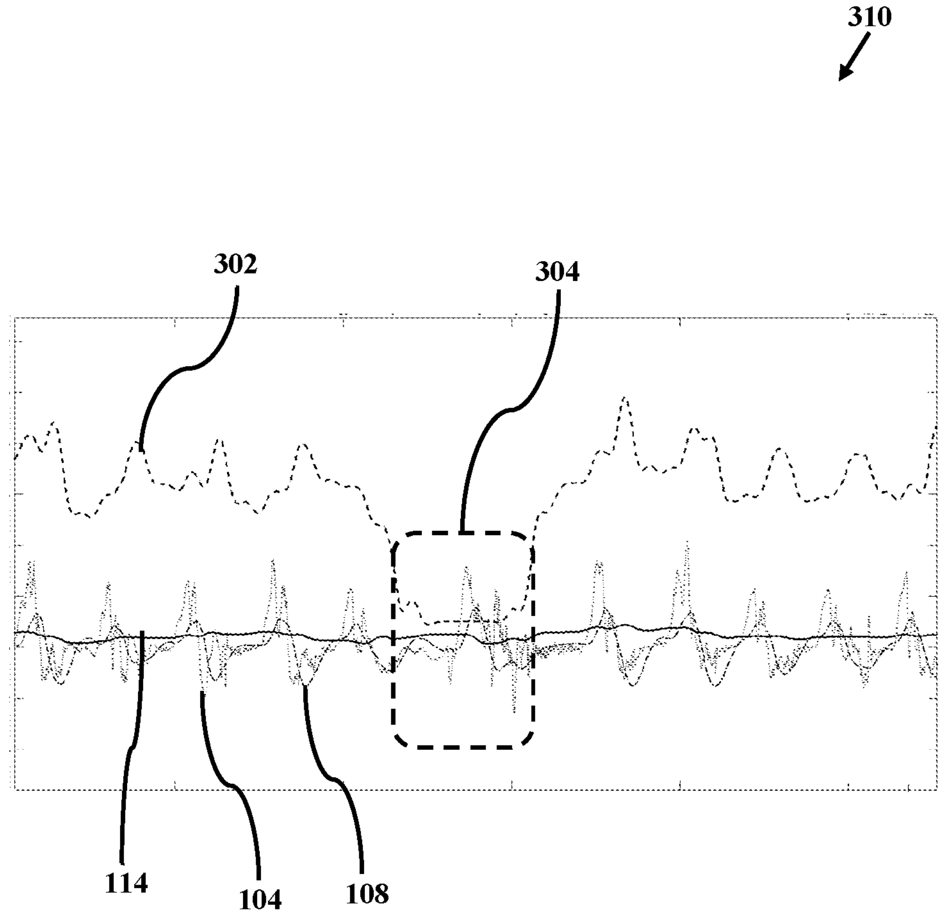
FIG. 3 is a plot of signals over X-axis and Y-axis of the gyroscope, according to an embodiment of the present disclosure.

FIG. 3 is a plot of signals over X-axis and Y-axis of the gyroscope, according to an embodiment of the present disclosure. A third plot 310 depicts the use of two axes by the controller 110, specifically Y axis and X-axis together to determine nonswim activity. When the swimmer is performing strokes of breaststroke swim style, there is not much rotation happening around Y axis. Thus, the filtered signal 108 along Y axis has low amplitude and thus energy envelope signal 114 along Y axis is also low even during the swim time. Therefore, swim time might also get predicted as non-swim time wrongly if only energy value along Y axis is used as the one and only feature. Thus, the controller 110 is provided with one more feature to robustly detect non-swim time irrespective of the swim style, i.e. the energy envelope signal 302 of the gyroscope 102 over X axis. Consider the swimming style performed by swimmer in this case is breaststroke. From the third plot 310, the energy envelope signal 114 over Y axis is low during both swim time and rest (nonswim) time. But the energy envelope signal 302 in X axis is very high during swim time and low during rest (non-swim) time as shown by the third window 304. Thus, the energy envelope signal 302 along X axis is a suitable feature for non-swim time detection.

Now the detector 116 is explained. As disclosed before, the controller 110 is configurable to use only one axis, i.e. Y axis if a specific type of swim style is set before swimming. In an alternate embodiment, the controller 110 is configurable to use two axes i.e. Y axis and X axis to make the determination of non-swim activity detection agnostic to the swim style. Now the use of energy envelope signal 114 over both the axes is explained with reference to FIG. 3. The energy envelope signal 114 over both the axes is computed and passed through detector 116 which comprises detection logic. The energy along X axis data is taken as first feature and energy along Y axis data is taken as second feature. The detector 116 acts as a classifier and classifies the current segment into either swim time or non-swim time based on the values of input features. If value of first feature is lesser than first threshold energy and value of second feature is lesser than second threshold energy, then an output flag 118 is high (Output=1) and output flag 118 is zero (Output=0) in all other cases. When output flag 118 is high, it indicates that current segment is non-swim time and thus the swimmer is making start/stop/rest. When output flag 118 is low, it indicates that the person is swimming. Based on empirical analysis of data of different swimming sessions with swim time as well as non-swim time, the first threshold energy and second threshold energy of the first feature and the second feature are decided and detector 116 is formed. Again just for example, first threshold for first feature is set equal to 3.1 and second threshold for second feature is set equal to 0.2.

According to an embodiment of the present disclosure, the controller 110 is configured to use non-swim time output to increase accuracy of swim performance metrics. The controller 110 is able to calculate total swim time vs. total pool time. Whenever output of detector 116 is high (indicating segment as start/stop/rest), it is added into 'non-swim time' metric and whenever the output of detector 116 is low, it is added into 'swim time' metric. Thus, 'total pool time' is calculated as 'swim time' plus 'non-swim time'. In other words, time period detected as non-swim need to be subtracted from total pool time to get actual swim time swum by the swimmer.

Similarly, the controller 110 is configured to discard false positives of a stroke counter module, a length counter module, and a swim type classifier module when a segment of the swim session is detected as non-swim activity. The controller 110 removes false positive strokes during rest time. Arm movements made by swimmer during rest time could be detected as swimming stroke falsely by stroke counter module. Once a segment is detected as 'non-swim', then all the false strokes reported during that time by stroke counter module are negated. This helps in improving the stroke counting accuracy. The controller 110 also removes false positive lengths during rest time. The stroke count value is used inside length counter module to validate turns. Sometimes, sudden movements performed by swimmer like jumps, etc. during rest time might get detected as 'turn' by turn detector module. But since non-swim detection output negates false strokes and thus keeps stroke count number very low, false turns will not get validated and thus improves length counter accuracy.

The controller 110 is able to improve swim style prediction. The arm movements done by swimmer during non-swim time could get wrongly predicted as one of the four swim styles (butterfly/breaststroke/freestyle/backstroke) and thus give wrong indication to swimmer. Thus, when non-swim output flag 118 is high, swim style classifier is disabled to stop any prediction during that time. In this manner, non-swim detection output is used to increase accuracy of swimmer's performance metrics in wearable devices 100 and enables the swimmer to take rest/pause anywhere in the pool without needing manual input from him.

According to an embodiment of the present disclosure, the at least one gyroscope 102 is part of a wearable device 100 worn by the swimmer or externally connected to the wearable device 100. The wearable device 100 is any one selected from a group comprising a smart watch, a smart ring, a smart band, and a sensor module. In an embodiment, the controller 110 is a cloud or smartphone which receives signal from the sensor module worn by the swimmer. The sensor module is equipped with at least one gyroscope 102. Further, the gyroscope 102 is either at least three-axis gyroscope 102 or multi-axes gyroscope 102. Alternatively, a single axis gyroscope 102 is used for each axis of interest.

According to the present disclosure, a working of the controller 110 is envisaged. Consider a user wearing the smartwatch. Assuming that the swim metrics feature is active or even the detection of swim metrics is automatically activated, the controller 110 starts monitoring and recording the data received over X-axis and Y-axis. The controller 110 generates filtered signal 108 over both the X axis and Y axis, followed by calculating the respective energy envelope signal 114 by the energy envelope estimator 112. The detector 116 compares the value for the segment (say 3 second frame) of both the axes with first threshold and second threshold. If the output flag 118 is high, then non-swim activity is detected, else it is swim activity. Accordingly, the other modules of the controller 110 uses the output to correct their values for accurate swim metrics such as stroke count, length count, swim type detection, total swim time, total pool time, etc.

Similar approach works well if case the controller 110 is configured to use data from the Y-axis only, in which case the swimmer must preset the swim type other than breaststroke. In other type of strokes such as butterfly stroke, freestyle, backstroke, the data from Y-axis can be used alone.

Figure 4:
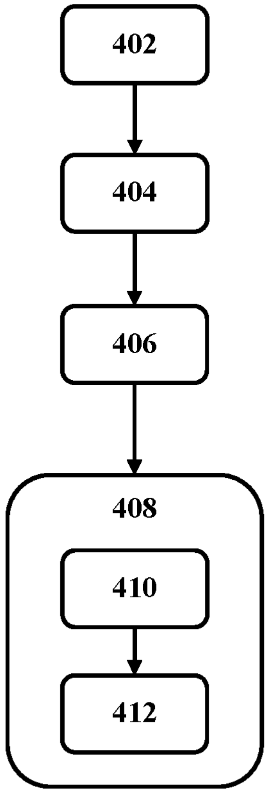
FIG. 4 illustrates a method flow diagram for determining non-swim activity of the swimmer, according to the present disclosure.

FIG. 4 illustrates a method flow diagram for determining non-swim activity of the swimmer, according to the present disclosure. The method comprises plurality of steps of which a first step 402 comprises receiving raw signals 104 from at least one gyroscope 102 for at least two axis. The method is characterized by a step 404 which comprises processing the raw signals 104 through a Band Pass Filter (BPF) 106 and providing the filtered signal 108. A step 406 comprises determining by the energy envelope estimator 112, the energy envelope signal 114 for at least one axis from the at least two axes. A step 408 comprises determining, by the detector 116, a non-swim activity in the segment of the raw signals 104 based on the filtered signal 108 and the energy envelope signal 114. The method is executed by the controller 110 and complements the same.

According to the method, the energy envelope estimator 112 comprises the step of generating the energy envelope signal 114 using sliding window average of the preset window size over the filtered signal 108. The detector 116 comprises a step 410 of comparing values of the energy envelope signal 114 for at least one axis against respective threshold value, and a step 412 classifying the segment of the raw signals 104 as non-swim activity upon satisfactory comparison.

According to the present disclosure, the at least one axis is selected from a group comprising Y-axis, and X-axis and Y-axis. When the swim style is preset other than breaststroke, the method use only Y-axis data. On the other hand, to make the method agnostic to swim style, data from both the X and Y axes are usable. The method also comprises discarding false positives of the stroke counter module, the length counter module, and the swim type classifier module when the segment of the swim session is detected as non-swim activity. Further, the at least one gyroscope 102 is located in the wearable device 100 worn by the swimmer or external device wirelessly connected to the wearable device 100. The wearable device 100 is any one selected from a group comprising the smart watch, the smart ring and the smart band and the like.

According to the present disclosure, the controller 110 for automatic nonswim (Start/Stop/Rest/others) detection in swimming application is disclosed. There is no manual input from swimmer, and requires only one sensor causing low power consumption.

It should be understood that the embodiments explained in the description above are only illustrative and do not limit the scope of this disclosure. Many such embodiments and other modifications and changes in the embodiment explained in the description are envisaged. The scope of the disclosure is only limited by the scope of the claims.

What is claimed is:

1. A system for determining non-swim activity of a swimmer, comprising:

a processor configured to:

receive raw signals from at least one gyroscope for at least two axes of the at least one gyroscope;

process the raw signals through a band pass filter and receive a filtered signal from the band pass filter, the band pass filter stored in a non-transitory memory operably connected to the processor;

process the filtered signal using an energy envelope estimator, the energy envelope estimator stored in the non-transitory memory, and determine an energy envelope signal for at least one axis of the at least two axes; and determine a non-swim activity segment of the raw signals based on the energy envelope signal using a detector, the detector stored in the non-transitory memory, wherein the energy envelope estimator is configured to generate the energy envelope signal using a sliding window average of a preset window size over the filtered signal.

2. The system as claimed in claim 1, wherein the detector is configured to (i) compare values of the energy envelope signal for the at least one axis against a respective threshold value, and (ii) classify the non-swim activity segment of the raw signals as the non-swim activity upon satisfactory comparison.

3. The system as claimed in claim 1, wherein the at least one axis is selected from a group comprising: Y-axis, and X-axis and Y-axis.

4. The system as claimed in claim 1, wherein the processor is further configured to discard false positives of a stroke counter module, a length count module, and a swim type classifier module when the non-swim activity segment is detected.

5. The system as claimed in claim 1, wherein:

the at least one gyroscope is part of (i) a wearable device configured to be worn by the swimmer, or (ii) an external device connected to the wearable device, and the wearable device is selected from a group comprising: a smart watch, a smart ring, and a smart band.

6. A method for determining non-swim activity of a swimmer, comprising:

receiving raw signals from at least one gyroscope for at least two axes of the at least one gyroscope;

processing the raw signals through a band pass filter and receiving a filtered signal;

processing the filtered signal by an energy envelope estimator, and determining an energy envelope signal for at least one axis of the at least two axes, and determining, by a detector, a non-swim activity segment of the raw signals based on the energy envelope signal, wherein the energy envelope estimator is configured to generate the energy envelope signal using a sliding window average of a preset window size over the filtered signal.

7. The method as claimed in claim 6, wherein the detector is configured to (i) compare values of the energy envelope signal for the at least one axis against a respective threshold value, and (ii) classify the non-swim activity segment of the raw signals as non-swim activity based upon satisfactory comparison.

8. The method as claimed in claim 7, wherein the at least one axis is selected from a group comprising: Y-axis, and X-axis and Y-axis.

9. The method as claimed in claim 6, further comprising:

discarding false positives of a stroke counter module, a length count module, and a swim type classifier module when the non-swim activity segment is detected.

10. The method as claimed in claim 6, wherein:

the at least one gyroscope is located in (i) a wearable device worn by the swimmer, or (ii) an external device connected to the wearable device, and the wearable device is selected from a group comprising: a smart watch, a smart ring, a smart band, and a sensor module.

* * * * *